UNITED STATES PATENT OFFICE.

LELAND E. WEMPLE, OF ST. LOUIS, MISSOURI, ASSIGNOR TO AMERICAN ZINC, LEAD & SMELTING CO., OF BOSTON, MASSACHUSETTS, A CORPORATION OF MAINE.

PREPARING PIGMENT ZINC OXID.

1,292,976.  Specification of Letters Patent.  Patented Jan. 28, 1919.

No Drawing.  Application filed January 9, 1918.  Serial No. 210,982.

*To all whom it may concern:*

Be it known that I, LELAND E. WEMPLE, a citizen of the United States, and resident of St. Louis, in the county of St. Louis and State of Missouri, have invented an Improvement in Preparing Pigment Zinc Oxid, of which the following description is a specification.

This invention relates to a method of producing zinc oxid for use as a pigment and the object is to obtain a product of pure chemical composition, white color and superior physical properties. Commercial zinc oxid for use as a pigment is produced by the volatilization of zinc from ores and other zinc bearing materials which usually contain lead in greater or less quantity and impurities of cadmium, arsenic, antimony and sulfur. In preparing a pigment it is necessary that there be no appreciable amount of soluble zinc salts or of colored compounds which would detract from the clear white color of the product. Among the compounds the presence of which is inadmissible may be mentioned principally the oxids of lead and cadmium, which give the product a yellowish or brownish color respectively, the sulfids which give a dark or reddish color respectively, and zinc sulfate and sulfite which, although white, are soluble. Zinc sulfate is objectionable because of its causing the pigment to lump together, preventing complete incorporation with oil, and because it washes out on exposure to the atmosphere. Zinc sulfite and occluded sulfur dioxid gases are objectionable because of their interaction with the oils used in making paint, thereby causing the paint to curdle.

In accordance with my present invention, a pigment is prepared in which the lead and cadmium appear as sulfates or more probably as basic sulfates and in which there is no appreciable amount of zinc sulfate, zinc sulfite and occluded sulfur dioxid. The process also eliminates the objectionable compounds of arsenic, antimony and the like. As far as I at present understand the theoretical reactions underlying my process, its success is based in part upon the apparent fact that the sulfate radical has a greater affinity for lead or cadmium than for zinc so that lead oxid or cadmium oxid will not be present in the product in the presence of an appreciable amount of zinc sulfate. For convenience I shall herein refer to such an amount of zinc sulfate as "an excess". I am therefore enabled to produce a desirable product by preparing the same with an excess of zinc sulfate and eliminating the same while leaving the lead sulfate and cadmium sulfate unaffected.

In accordance with my present invention, I prepare a crude product having an excess of zinc sulfate. This is equivalent to a statement that oxids of lead and cadmium are not present because they would react with the zinc sulfate to form sulfates of lead or cadmium and zinc oxid. This product may be obtained, if the zinc-bearing material is deficient in sulfur content, either by introducing the sulfur prior to the volatilization or by treating the volatilized product thereafter with sulfur as a separate step. Usually sulfur is present in greater or less amount in the raw material or in the fuel with which it is volatilized and a further quantity of foreign sulfur may conveniently be mixed with the raw material so that the immediate product of the volatilization process is a mixture containing zinc sulfate. However, the sulfur may be introduced in any other suitable manner without departing from the spirit of my invention.

Having obtained the crude product as described, to refine the same for use as a pigment it is necessary only to eliminate the soluble zinc salts, it being understood that this process of elimination must leave the lead and cadmium present unchanged in the unobjectionable form of sulfates. It will be understood that while cadmium sulfate is more or less soluble, the total amount of cadmium present is small and that, therefore, the presence of a small amount of cadmium sulfate is not material, whereas the oxid and sulfid have such great tinctorial power that even traces cannot be admitted. Theoretically it should be possible to remove the soluble zinc compounds by lixiviation, but this is commercially impracticable because of the difficulty of wetting the very bulky fume, the loss of a large portion thereof which floats away in the washing liquors and the objectionable densifying of the grain of the ensuing product. It has been proposed to heat the crude fume to a temperature sufficient to decompose zinc sulfite and drive off the sulfur dioxid, but unless the temperature is much increased the zinc sulfate cannot be eliminated. In fact, because the sulfur dioxid may be oxidized and react with the zinc oxid to form zinc sulfate, the content of the latter in certain instances would actually increase. If the crude product is heated to a temperature sufficient to decompose the sulfate the texture or grain of the refined product is undesirably densified and this would be manifested by decrease in its oil-absorbing capacity. Furthermore, the lead sulfate or cadmium sulfate which is present would also be broken up to a greater or less extent and the product so discolored and rendered undesirable for use as a pigment.

A suitable method of eliminating the zinc sulfate in accordance with my invention is to mix with the crude product a suitable quantity of combining or reducing agent, which may preferably be lamp black, since no objectionable ash will result therefrom. For example, a small quantity, as from 1 to 2% of lamp black, is suitable. The mixture of crude fume and carbon is then heated, conveniently in a hearth furnace in which it may be spread out in thin layers. A furnace of the muffle type is preferable as it prevents contamination with fuel ash. The heating may be prolonged for about half an hour at a temperature of about 1100° F. and preferably it is stirred during this time. The temperature to be used would vary, particularly with the lead content. A lower temperature and longer heating is desirable when the amount of lead present is greater. As far as I have now determined, however, the temperature should not exceed 1200° F. or be much less than 900°. At too low temperatures the carbon smokes off and is not effective; at too high temperatures the lead and cadmium sulfates are attacked and reduced by the carbon. Within such a temperature range as stated, however, there appears to be a selective action on the zinc sulfate alone and in particular the use of a solid agent, such as lamp black, permits this selective reaction to be readily controlled as a matter of commercial practice.

After the material has been heated as described, the material may be stirred with free access to air to permit any remaining excess of carbon to be burned away and to facilitate the escape of sulfur dioxid and any other occluded gases. This continued stirring and consequent rapid cooling prevents agglomeration of particles and the formation of crystalline compounds. It will therefore appear that the presence of an unnecessary amount of carbon is to a degree immaterial. The excessive quantity is merely superfluous and is always eliminated.

The exact action of the reducing agent on the individual salts present is not entirely clear. It seems, however, that the carbon will directly reduce the zinc without, at the temperatures set forth, affecting lead or cadmium salts, or if it attacks the latter they immediately combine with the excess zinc sulfate, reducing the same to zinc oxid and being themselves reconverted into sulfates. On the other hand, if all the sulfates are attacked by the carbon, the sulfate radical liberated from the zinc salts, recombines with any lead or cadmium oxid which may be formed and for which it has a greater affinity than for zinc. The first hypothesis is more probable since when an excess of carbon is present there is not under the conditions specified a reduction of lead and cadmium sulfates with the production of lead oxid or cadmium oxid in the finished product.

It is possible to utilize lead oxid or cadmium oxid directly as a reducing agent, in which case they will be transformed to sulfates and the zinc sulfate is eliminated as such. Such an oxid of a metal having a white sulfate is an example of a suitable combining agent which perhaps might not be considered a reducing agent in the more restricted sense of that term. Of course if lead or cadmium oxid is used the quantity of these salts must be carefully regulated, since a slight excess deleteriously affects the color of the product. It would be feasible, however, to utilize them in part as reducing agents in connection with carbon which, reacting in some such manner as suggested above, would prevent the appearance of an excess of lead or cadmium oxid in the finished product. Such a process, however, would give as a final product a highly leaded zinc oxid, when using lead oxid and a product containing excessive amounts of cadmium salts when using cadmium oxid.

While various reducing agents might be used, it seems more desirable to utilize a solid material such as lamp black which will be directly mixed in intimate contact with the crude fume, rather than to treat the fume with carbon monoxid, for example, which if used on a commercial scale might entail so vigorous a reaction as to cause a reduction of the insoluble sulfates. In other words, it seems that it is desirable to utilize rather the reaction between solids than that between a solid and a gas, as the latter is more rapid and vigorous in its action, is difficult to control and would therefore be less practicable commercially.

In the above description I have referred specifically to sulfur compounds and these are in fact the most troublesome. Other compounds, such for example as those of arsenic and antimony, may, however, be present but the treatment described which eliminates the objectionable sulfur salts of zinc will also eliminate the objectionable compounds of arsenic or antimony.

Certain grades of crude oxids as produced by volatilization furnaces contain appreciable amounts of carbon or other reducing agents. By mixing such oxid with other grades a suitable material may be obtained for use in the reduction process here described. If desired, the volatilization furnaces may be so conducted as to produce of intention a crude product having a high carbon content and such material could be used as a "temper batch" for mixing with other oxids comparatively free from carbonaceous matter. A similar temper batch might also be prepared by artificially adding to a quantity of fume lamp black or other suitable reducing agent in amounts greater than would be required if that quantity alone were to be treated. It is also possible to so regulate the volatilization process as to produce directly a crude material containing carbon in a quantity desirable to permit direct heating to effect desulfurization without addition of any further material or agent. In other words, it is possible to provide for the presence of a reducing agent without necessarily making the addition thereof to a material to be treated an independent step. It will be well understood by those skilled in the art that the fume is cooled in pipe lines and the ash and other material produced from the fuel used settles out in dust chambers and other devices provided in the pipe lines. Fine flocculent carbon, however, will not be removed by these devices and therefore the material prepared will contain the carbon in a substantially ash-free form.

Under actual conditions of practice I have been able, by utilizing the principles of my invention, to produce a zinc oxid for use in pigments in which the lead and cadmium appeared as sulfates, or more probably as basic sulfates, and in which the zinc sulfate and sulfite were eliminated. I have successfully eliminated an excess of from 4 to 5% of zinc sulfate without causing lead oxid or cadmium oxid to reappear in the finished product. The loss of oxid is negligible and the product is of a brilliant white color and has the bulk, oil-absorbing capacity, body, covering power and other properties desired for paint purposes. It is possible to produce large quantities of oxid perfectly uniform as to these desirable properties.

The coarsening of the grain due to excessive heating, as found in some proposed processes, is avoided. Not only is the discoloration due to the presence of oxids avoided but the lead and cadmium appear as sulfates of amorphous form, and presumably as basic sulfates which are more desirable for pigments than other salts which are nevertheless white in color. For example, it has been proposed to prepare a crude fume having lead present in the form of oxid and to convert this colored salt to the white carbonate by treatment with $CO_2$ or to treat fume containing lead sulfate in such manner as to decompose the sulfate with the formation of oxid which was, by the treatment mentioned, converted into carbonate. The temperature required by the process destroyed the flocculent character of the zinc oxid, densifying the grain and so reducing its oil-absorbing capacity and otherwise harmfully affecting the physical qualities desirable in a pigment. Furthermore, the slow cooling necessary to complete the reaction favored the formation of carbonate in crystalline form unadaptable for use in a paint. Also, in attempting to carry out the process commercially the product was contaminated with ash and rendered gritty.

It has heretofore been commercially practical to produce lead-free and low-leaded zinc oxid only from carbonate or silicate zinc ores which were practically free from sulfur or cadmium. Even with these, however, lead appeared as an oxid and if the amount exceeded about one per cent., caused appreciable discoloration. Highly leaded zinc oxid containing from 35 to 50% of lead sulfate could be made from roasted ores which contained some small percentage of sulfur. Here the lead in part combined with the sulfur to form sulfates but since it was necessary to exclude such an amount of sulfur as would entail the formation of zinc sulfate, a greater or less quantity of the lead remained in the final product as oxid and more or less discolored the product thereby preventing its use for any other than dark colored paints. When cadmium was present the ore could not hitherto be utilized because of the very high tinctorial power of its compounds.

By the process herein described it is possible to utilize raw materials not hitherto available. It is possible to prepare white, lead-free or low-lead zinc oxids from ordinary sulfid ores or ores containing appreciable amounts of sulfur and cadmium, and it is also possible to make high-lead zinc oxid which is a brilliant white color and adaptable for use in white or light paints instead of being the yellowish color heretofore obtained. It will therefore be understood that while the process is of general application it may be utilized in particular to produce commercial products new in themselves.

My product is of a whiteness not inferior to white lead and is comparable to well-known brands of zinc oxid now on the market such as AAA of the American Zinc, Lead & Smelting Company and XX of the New Jersey Zinc Company and is similar to the French process zinc oxids. The color of the product may be observed in comparison with others by rubbing up to a thick paste small portions of the pigments to be compared each with a few drops of poppy seed oil, transferring the pastes so obtained to a piece of clear optical glass, and spreading them to a thickness such as will not transmit light and in such a manner that the two pastes just touch. On viewing the line of contact through the back of the glass, the difference in color can be easily seen. The fineness of the pigment prepared by my process is equal to that of zinc oxids collected direct from volatilization processes without subsequent reheating or prolonged retention at high temperatures. The oil absorbing capacity and covering power or body of my resulting zinc oxid is equal to that of the American process zinc oxids above referred to and the material will spread out evenly and smoothly when combined with oil.

The following data of tests of the material prepared in accordance with my process will serve to illustrate certain of these properties:—

The test for tinting strength and hiding power as compared with standard pigments of similar lead content may be conducted in the following manner:—Two grams of the pigment are mixed with a definite amount of high-grade ultramarine blue, for example—.10 or .20 grams, the larger amount being used with low leaded pigments and the smaller amount with high leaded pigments in order to obtain the delicate color shade with which small differences may be noted, and a definite quantity of high-grade poppy seed oil, as for example, 20 to 30 drops, and the mixture rubbed up to a thick paste. Pastes of the standard oxids with which the pigment is to be compared are then prepared in a similar way, exactly the same amount of pigment, color and oil being used. The two pastes to be compared are then spread on a piece of clear optical glass to a thickness that will not transmit light and in such a manner that the edges adjoin. On viewing the line of contact of the two pastes through the back of the glass it is observed that the pigment prepared by the process herein described is as light or lighter in shade, indicating that it is as strong or stronger in tinting strength and has equal or greater hiding power than the pigments with which it is compared.

The oil absorbing capacity may be determined in the following manner:—Two pounds (907 grams) of pigment are ground to a paste in a 6" burrstone mill with 350 cc. of refined linseed oil having an acid number four. 100 grams of this paste are thoroughly mixed with a sufficient amount of the same oil to produce a paint which will gave a tail length of 2" when flowed on glass for five minutes in the following manner:— A portion of the paint prepared by diluting the paste is transferred to a pipette having a $\frac{1}{16}$" circular orifice. Five drops of paint from the pipette are allowed to fall on a smooth glass plate held in a horizontal position, the pipette being held in a vertical position with its orifice about $\frac{1}{2}$" above the plate. The plate is then placed in a vertical position and the paint allowed to run for five minutes. The length of the tail is then measured and the test repeated, using paint prepared from the paste with more or less oil, until a consistency is obtained which will give a tail length of exactly 2". The amount of oil required to give such a standard length in five minutes is a measure of the oil absorbing capacity, body or covering power of the pigment. The pigment products produced by the process herein described, when tested in this manner, have been found to require, in the case of low leaded zinc oxids, a total of approximately 60% oil, and in the case of higher leaded zinc oxids a total of approximately 50 to 60% oil, to produce a paint of this standard consistency.

Analyses of the pigment as herein prepared appear to indicate that not only are the lead and cadmium present saturated with sulfur in such manner as to satisfy completely their chemical affinity for sulfur in the form of sulfate, but that there is an excess of sulfur appearing in non-soluble form and not as sulfur dioxid, zinc sulfite or normal zinc sulfate. It is supposed that this sulfur occurs as zinc sulfid or as a basic zinc sulfate.

In the present specification I have outlined the essential principles of my invention and have explained the theories underlying the same as I now understand them, but while I believe the theories expounded to be accurate I wish to emphasize that the efficacy of my improved method has been empirically demonstrated. I have also described specifically, by way of example, a single embodiment of my invention, but it will be understood that I have done so with a descriptive rather than a definitive purpose and that the specific steps of the treatment set forth are not essential.

What I do claim and desire to secure by Letters Patent is:—

1. A method of preparing pigment zinc oxid comprising the following steps:—preparing a crude material by so oxidizing zinc bearing materials in the presence of sulfur as to provide a crude oxid having an excess of zinc sulfate and containing lead as sulfate and heating the crude oxid with a reducing agent under temperature conditions entailing selective reaction thereof with zinc sulfate to the exclusion of lead sulfate.

2. A method of preparing pigment zinc oxid comprising the following steps:— preparing a crude oxid with complete sulfation of lead or cadmium whereby an excess of zinc sulfate is formed and eliminating said zinc sulfate by treatment with a decomposing agent under conditions rendering such agent inert to lead or cadmium sulfate.

3. A method of preparing pigment zinc oxid comprising the following steps:— preparing a crude oxid with complete sulfation of lead or cadmium whereby an excess of zinc sulfate is formed and eliminating said zinc sulfate by heating with carbon within limits ranging substantially between 900° and 1200° F.

4. A method of preparing pigment zinc oxid characterized by heating a mixture of crude oxid having an excess of zinc sulfate and wherein lead or cadmium appears as sulfate and not appreciably as oxid and of a relatively weak reducing agent within limits ranging substantially between 900° and 1200° F.

5. A method of preparing pigment zinc oxid characterized by heating a mixture of crude oxid having an excess of zinc sulfate and wherein lead or cadmium appears as sulfate and not appreciably as oxid and of a relatively weak reducing agent within limits ranging substantially between 900° and 1200° F. and disaggregating the product in air.

6. A method of preparing pigment zinc oxid characterized by heating in air out of contact with furnace gases and within limits ranging substantially between 900° and 1200° F. a mixture of crude oxid having an excess of zinc sulfate and wherein lead or cadmium appears as sulfate and not appreciably as oxid and of substantially ash-free carbon.

7. A method of preparing pigment zinc oxid characterized by providing a crude oxid substantially free of lead oxid or cadmium oxid and containing an excess of zinc sulfate and subjecting the crude oxid to the action of a reducing agent to decompose the zinc sulfate, the temperature during the reduction process being restrained to retard the action and exclude decomposition of sulfates of lead or cadmium.

8. A method of preparing pigment zinc oxid characterized by providing a crude oxid substantially free of lead oxid or cadmium oxid and containing an excess of zinc sulfate and subjecting the crude oxid to the action of a relatively weak reducing agent at a temperature ranging substantially between 900° and 1200° F.

9. A method of preparing pigment zinc oxid characterized by heating a crude material containing lead or cadmium as sulfates and substantially free of oxids of those metals and containing an excess of zinc sulfate with a reducing agent in solid phase under temperature conditions ineffective thereby to desulfurize lead or cadmium.

10. A method of preparing pigment zinc oxid characterized by heating a crude material containing lead or cadmium as sulfates and substantially free of oxids of those metals and containing an excess of zinc sulfate with a solid carbonaceous material at a temperature ranging substantially between 900° and 1200° F.

11. The process of preparing refined zinc oxid including volatilizing zinc-bearing materials under conditions producing a carbon-containing crude product and heating the product at moderate temperatures effecting elimination of soluble zinc compounds by reduction while excluding discoloration of the product or densifying thereof.

12. The step in preparing pigment zinc oxid which consists in sulfating raw zinc-bearing material containing minor quantities of lead or cadmium by interaction with sulfate-forming materials in quantity to convert all lead or cadimum present to sulfates and also a small proportion of zinc.

13. A method of preparing pigment zinc oxid comprising the following steps:— preparing a crude material by treatment of zinc bearing materials in the presence of sulfur to provide a crude oxid having an excess of zinc sulfate and containing lead or cadmium as sulfate and not appreciably as oxid and eliminating said excess of zinc sulfate by treatment with a combining agent to convert the same into insoluble zinc compounds under conditions rendering such agent inert to lead or cadmium.

14. As a new commercial product, a homogeneous zinc oxid pigment containing lead solely as insoluble white sulfur compounds, having not more than one per cent. soluble zinc sulfate and only negligible amounts of occluded sulfur dioxid, said pigment containing sulfur in insoluble form in excess of that required to completely sulfatize the lead present, the product being of a whiteness not inferior to white lead and comparable to the American Zinc, Lead & Smelting Company's AAA and the New Jersey Zinc Company's XX oxid and combining with substantially an equal or greater weight of oil to produce a 2" tail in five minutes, as described.

15. As a new commercial product, a homogeneous zinc oxid pigment having not more than one per cent. soluble zinc sulfate and only negligible amounts of occluded sulfur dioxid, said pigment containing sulfur in insoluble form in excess of that required to completely sulfatize metals other than zinc which are present, the product being of a whiteness not inferior to white lead and comparable to the American Zinc, Lead & Smelting Company's AAA and the New Jersey Zinc Company's XX oxid and combining with substantially an equal or greater weight of oil to produce a 2" tail in five minutes, as described.

In testimony whereof, I have signed my name to this specification.

LELAND E. WEMPLE.